May 2, 1944.  R. S. DRUMMOND  2,347,998
GEAR CROWNING
Filed April 28, 1941  2 Sheets-Sheet 1

INVENTOR.
ROBERT S. DRUMMOND
BY Whittemore, Hulbert
& Belknap  ATTORNEYS

May 2, 1944.  R. S. DRUMMOND  2,347,998
GEAR CROWNING
Filed April 28, 1941　　2 Sheets-Sheet 2
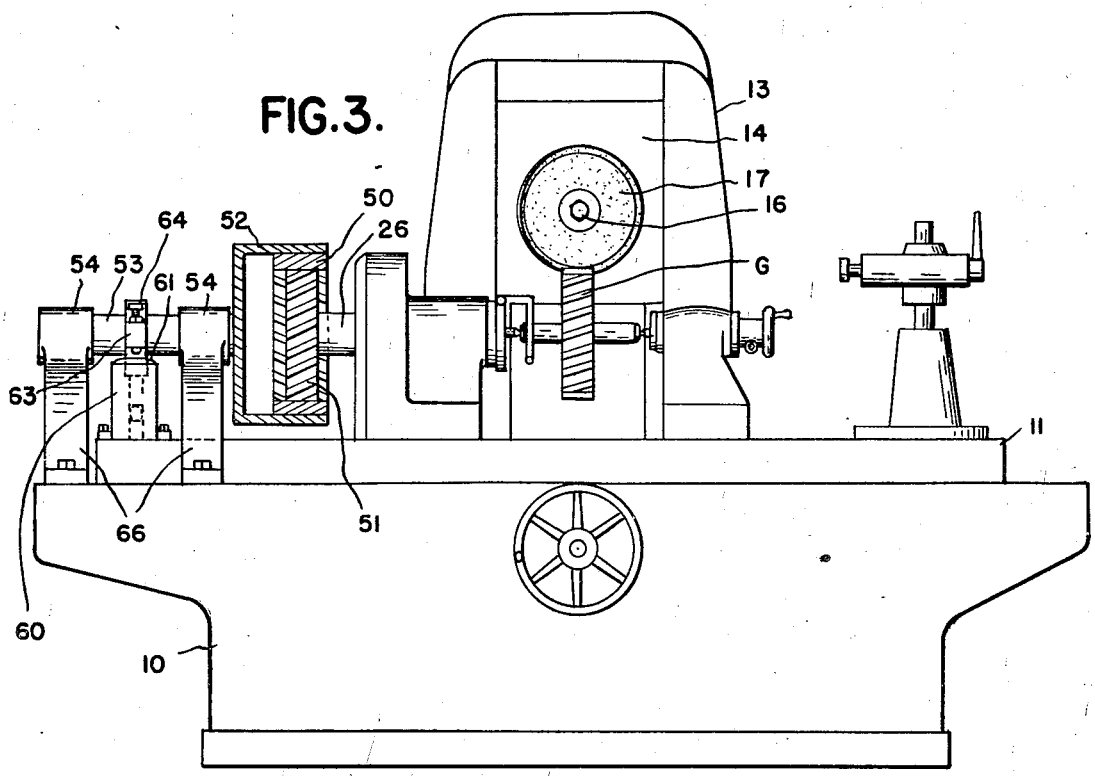
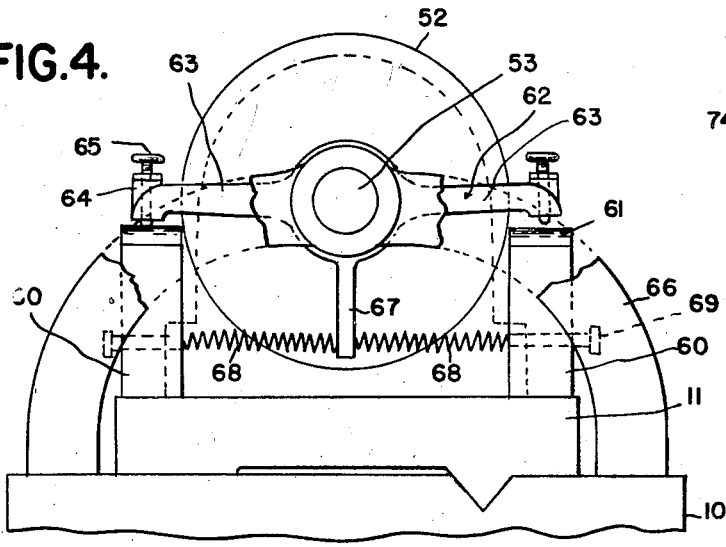
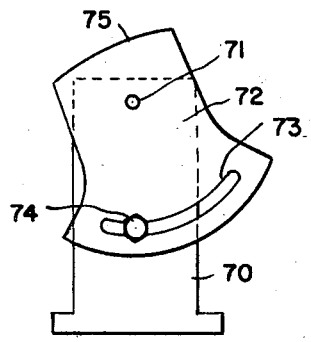
INVENTOR
ROBERT S. DRUMMOND
BY Whittemore, Hulbert
& Belknap ATTORNEYS Patented May 2, 1944

2,347,998

UNITED STATES PATENT OFFICE 2,347,998

GEAR CROWNING

Robert S. Drummond, Detroit, Mich.

Application April 28, 1941, Serial No. 390,831

2 Claims. (Cl. 51—287)

The present invention relates to gear crowning and more particularly to imparting a finished crowned surface to the teeth of either helical or spur gears.

The art of grinding gears has been practiced for a number of years, employing a grinding wheel whose working surface is trimmed to a profile corresponding to the profile desired on the faces of the gear teeth. The gear to be finished is then traversed past the grinder so that the trimmed periphery of the grinding wheel enters the tooth spaces of the gear being ground.

According to the present invention gear teeth are finished by a method which is modified and improved from the prior well-known method of grinding gear teeth.

Crowned gears are gears whose teeth are modified as to thickness so as to have less thickness adjacent their ends than at the mid portion thereof. Preferably the modification of thickness of crowned gear teeth is gradual, so that a pair of crowned gears, or a crowned gear and an uncrowned gear mesh with a contact which is heaviest at the central portion of the teeth and fades out so that appreciable clearance may be provided between the ends of meshing teeth. Sets of gears employing crowned teeth offer substantial advantages which are only now being fully recognized. Such sets of gears run more quietly than would otherwise be the case, and in addition gear failure is substantially reduced. This is because the gear failure more often than not results from an excessive load being placed at the corners or ends of the gear teeth, due either to faulty alignment of shafts or to distortion under load.

According to the present invention I provide gear teeth which are accurately ground to the desired profile and in addition are provided with a desired amount of crowning. Broadly described, I accomplish this by imparting a relative movement between the gear being crowned and the grinding wheel in accordance with the amount of crown desired as the gear is traversed past the grinding wheel. This may be accomplished by a number of methods, some of which are illustrated herein and others of which will be apparent to those skilled in the art after an inspection of the disclosure of the present application. This relative motion is superimposed on the normal relative movements employed in grinding.

It is accordingly an object of the present invention to provide a method and means for crowning gears by grinding the gears, which is characterized by superimposing upon other relative motions a crowning motion such as a slight crowning relative oscillation between the grinding wheel and the gear about the axis of the gear, carried out in timed relation to relative movement between the gear and grinding wheel axially of the gear.

More specifically it is an object of the present invention to provide camming means for relatively oscillating the gear and grinding wheel.

Other objects of the invention will be apparent as the description proceeds, and when taken in conjunction with the accompanying drawings, wherein:

Figure 3 is a more or less schematic front elevation, partly in section, illustrating the modified grinding machine for carrying out the present invention;

Figure 4 is an enlarged fragmentary view, with parts broken away, looking from the left in Figure 3;

Figure 5 is a detail view showing a modified form of cam.

Figure 1:
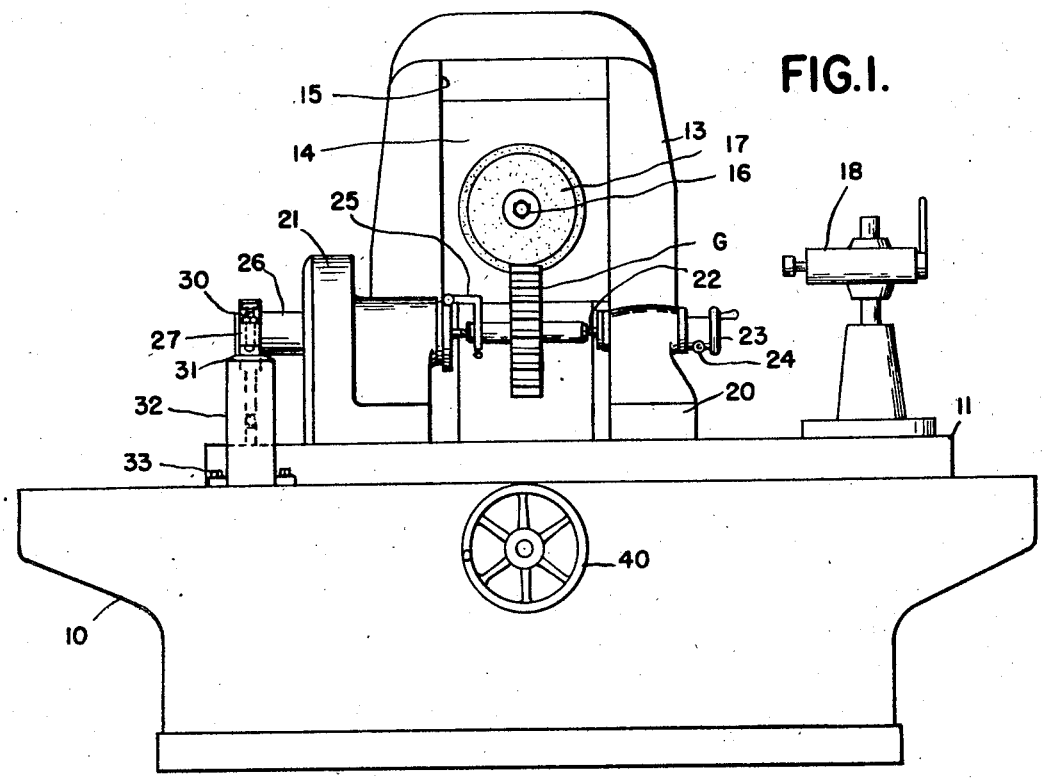
Figure 1 is a more or less schematic front elevation of the grinding machine for carrying out the present invention.
Figure 2:
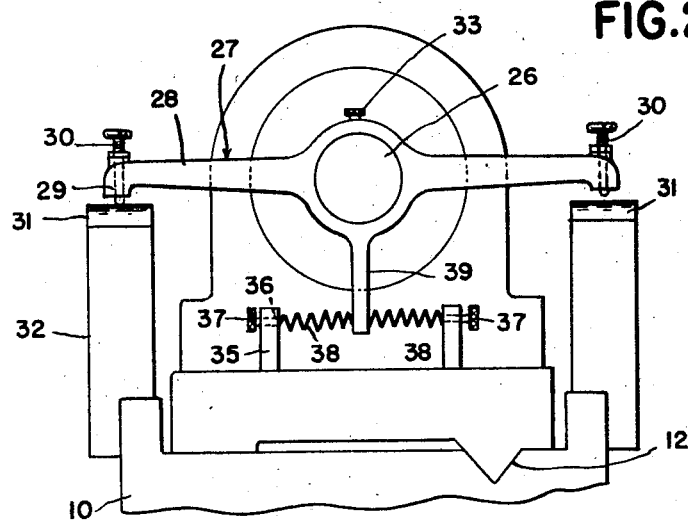
Figure 2 is an enlarged fragmentary detail view looking from the left in Figure 1.

Referring first to Figures 1 and 2, the grinding machine illustrated comprises a stationary base 10 upon which is mounted a slide or carriage 11 for reciprocation in suitable ways in the machine, these ways including V-ways 12 as indicated in Figure 2. This results in straight-line reciprocation of the carriage 11.

At the rear of the machine is a vertical column 13 which is adjustable about a vertical axis passing through the axis of the gear or work piece G. A tool support 14 is mounted for vertical adjustment in the column 13 in ways indicated generally at 15, in order to accommodate gears of different sizes.

Mounted on the tool support 14 is a spindle 16 to which is secured the grinding wheel 17, the periphery of which is trimmed by suitable means, such for example as the trimmer indicated generally at 18, to the desired profile.

When the gear being trimmed is a spur gear, as illustrated in Figure 1, column 13 is adjusted so that the axis of the grinding wheel supporting spindle 16 is perpendicular to the axis of the gear G. Mounted on the carriage 11 are supporting stocks 20 and 21. The stock 21 is provided with a center 22 and a handwheel 23 for advancing or retracting the center. Suitable clamping means, such as indicated at 24, are provided for locking the handwheel in adjusted position. The stock 21 includes indexing mechanism (not shown) by means of which the gear G may be rotated step by step in accordance with the circumferential spacing of the gear teeth. This indexing mechanism may take any convenient or conventional form, and is accordingly not shown. The gear G has a suitable fixture 25 interconnecting the same and the spindle of the stock 21 so as to impart rotation to the gear G.

To the left of the stock 21, as seen in Figure 1, and connected through the indexing mechanism to the fixture 25, extends a shaft 26 to which is secured a camming arm member 27, as best seen in Figure 2. Camming arm structure 27 includes a pair of diametrically opposite arms 28, each of which terminates in a head 29 through which is threaded a bolt 30 which is adapted to rest upon the camming surface 31.

Cam brackets 32 are bolted or otherwise secured to the base 10 as indicated at 33, and at their upper surfaces are provided with the cam surface 31 previously referred to. The member 27 is rigidly secured to the shaft 26, and in Figure 2 I have indicated this connection as comprising a set screw 33.

The bolts 30 which are adapted to engage with the cam surface 31 are adjusted so that they may be used alternately. As indicated in Figure 2, the left-hand bolt 30 is in contact with the surface 31, whereas the right-hand bolt 30 is out of contact with its corresponding cam surface 31.

Since the camming arm member 27 is rigidly secured to the shaft 26 it will move longitudinally therewith as the carriage 11 is traversed back and forth. Since the cam brackets 32 are rigidly secured to the supporting base 10, translation of the carriage 11 will result in relative movement between the cam arm member 27 and the cam brackets 32.

Spring means are provided for biasing the shaft 26, and hence the gear G in one direction or the other, and for this purpose I have illustrated a pair of posts 35 having openings 36 therein, into which threaded adjusting elements 37 extend. Tension springs 38 which are connected to a depending arm 39 of the camming arm member 27 are secured at their other ends to the elements 37 and accordingly tension of the springs may be adjusted so that the camming arm member 27 will be biased thereby in one direction or the other. With the set-up as illustrated in Figure 2, the right-hand adjusting element 37 will be tensioned and the left-hand adjusting element will be loosened, whereby the right-hand tension spring 38 will bias the camming arm member 27 in a counterclockwise direction so as to cause the left-hand bolt 30 to remain in contact with the camming surface 31.

In the operation of the machine the gear G is mounted between the center as illustrated and is locked in place thereon by means of the fixture 25. Rotation is imparted to the grinding wheel 17 after the same has been trimmed to the desired involute profile on its working periphery. The carriage 11 is then translated from a position on one side of the grinding wheel to a position on the other side, and a tooth surface of the wheel will thereby be finished.

Since this translation of the carriage 11 causes the camming arm member 27 to move relative to the camming bracket 32, a slight rotation will be imparted to the shaft 26 and through it and through the indexing mechanism (not shown) to the gear G. The tension spring 38 which maintains the bolt 30 in contact with the cam surface 31 will urge the gear against one side of the grinding wheel, and the slight rotation imparted to the gear through the cam means will result in the formation of a crowned surface. The gear will be indexed after each operation from tooth to tooth, and when all of the teeth have been thus finished on one side the gear may be reversed between the stocks 20 and 21, or the tension of the spring 38 may be reversed so as to bring the other bolt follower 30 into contact with the cam surface 31 to thereby finish the opposite sides of the teeth.

I have indicated at 40 in Figure 1 a handwheel by means of which the carriage 11 may be translated, although it will be understood that if desired suitable automatic means for translating the carriage and for indexing the gear may be provided.

In Figures 3 and 4 I have illustrated a similar mechanism for the purpose of crowning helical teeth. In this case the grinding machine is essentially the same except for the parts which will later be described in detail. The grinding machine comprises the base 10, the column 13, work support 14, grinding wheel 17 on the spindle 16, and carriage 11, all as previously described. When helical teeth are to be finished, the column 13 is adjusted about its vertical axis, passing through the axis of the gear being finished at an angle corresponding to the helix angle of the gear.

In order to finish a helical gear without crowning the same, by the apparatus illustrated, it is necessary to impart a rotation to the gear during translation of the carriage 11 in accordance with its helix angle. For this purpose I have illustrated an internal master gear 50 meshing with an external master gear 51, rigidly secured to the shaft 26 which connects to the indexing mechanism (not shown). Internal master gear 50 is supported in a fixture 52 mounted on a shaft 53, for rotation by two pedestal bearings 54. It will be appreciated that if the internal master gear 50 were held rigidly against rotation, translation of the carriage 11 to the right or left, as seen in Figure 3, would result in rotation of the shaft 26, and hence of the work gear G. The helix angle of the master gears 50 and 51, and of the work gear G, are the same, and the rotation thus imparted to the gear G would be just sufficient to finish the teeth of the gear G to the desired helix.

In order to impart a crowned formation to the ground helical teeth, I provide the following mechanism. Supported on the carriage 11, as best seen in Figure 4, are a pair of cam brackets 60, each terminating at its upper surface in curved camming surfaces 61. Rigidly secured to the shaft 53 is a camming arm member 62 having a pair of arms 63, each terminating in a head 64 in which is threadedly received the contact bolt 65. Bolts 65 are adapted to be brought into engagement with the camming surfaces 61.

I have illustrated the pedestal bearings 54 as provided with yoke arms 66 to provide clearance for the carriage 11. In order to bias the camming arm member 62 in one direction or the other so as to bring one or the other of the contact bolts 65 into engagement with the camming surfaces 61, I provide a depending arm 67 secured to the shaft 53 to which is connected a pair of springs 68, each of which is provided with separately adjustable tensioning screws 69. By means of screw 69 one or the other of the springs 68 may be tensioned, the other being preferably loosened at the same time so as to rock the camming arm member 62, and hence the shaft 53 one way or the other.

Since the cam brackets 60 are carried by the carriage 11 and since the shaft 53 is held against axial movement by reason of its mounting on the base 10, translation of the carriage 11 will result in a corresponding rocking of the shaft 53, and hence of the master gear 50. Since the master gear 50 is held against axial movement, translation of the carriage 11 will result in rotation of the shaft 26 and hence of the gear G in accordance with the helix angle of the master gears 50 and 51. But since the master gear 51 has a slight crowning oscillation imparted thereto by the camming mechanism previously described, the final resultant of the translation of the carriage 11 will be an axial translation of the gear G, a rotation of the gear G in accordance with its helix angle, and a superimposed, slight oscillation of the gear G in accordance with the desired amount of crown to be imparted thereto.

In the drawings I have indicated the curvature of the camming surfaces 31 and 61 as very much exaggerated in order to render the same clearly perceptible. As a matter of practice the amount of crown imparted is extremely small, ordinarily requiring accurate measuring instruments to detect the same.

The operation of the machine illustrated in Figures 3 and 4 is substantially identical with that shown in Figures 1 and 2. After the initial set-up, translation of the carriage 11 so as to move the gear G from one side to the other of the grinding wheel 17 results in grinding one side of a tooth to the proper involute profile and helix angle, modified as to thickness so as to provide a crowned surface. The gear is indexed by suitable mechanism so as to act upon the teeth successively, and after one side of all the teeth has been finished the gear may be reversed end for end between the centers, or the crowning mechanism may be biased in the opposite direction by tensioning the slack spring and loosening the previously tensioned spring.

In Figure 5 a somewhat different arrangement is illustrated, this being an adjustable camming structure adapted to be substituted for that shown at 32 in Figure 1. In Figure 5 I have illustrated a supporting bracket 70 which is adapted to be bolted or otherwise secured to the base 10 of the machine. Pivoted as indicated at 71 is a camming plate 72 having an arcuate slot 73 concentric with the pivot axis 71 and adapted to be locked in adjusted position relative to the bracket 70 by a locking screw 74. Cam plate 72 is provided with a curved camming surface 75, and if the camming plate 72 is adjusted so that the surface 75 is symmetrically related to a horizontal line, the operation of the machine will be precisely as illustrated in Figure 1. However, if the camming plate 72 is inclined as illustrated in Figure 5, the result will be the formation of a helical crowned tooth surface. It will be understood that in this case, the column 13 of the machine will be set around in accordance with the angular setting of the camming plate 72. It will further be appreciated that the curved surface 75 will be formed so as to provide, due solely to its own curvature, a motion which is equivalent to the helical generating motion, plus the oscillating crowning motion described in conjunction with Figures 3 and 4.

It will be appreciated that the character of the crown imparted to the gear tooth by the methods and apparatus disclosed above, would depend upon the curvature of the camming surface. Ordinarily it is desirable for this surface to have a curvature such that the amount of crown increases adjacent the ends of the gear teeth. In some cases, as for example on relatively wide gears, it may be desirable to leave the mid surface of the gear teeth unmodified. This will, of course, be accomplished simply by providing a straight surface on the mid portion of the cam, since the primary purpose of crowning is to avoid end interference between the gear teeth with its resultant disadvantages. It may in some cases be sufficient merely to round off the gear teeth a short distance from either end.

It will be appreciated of course that the amount of crown is theoretically limited by the diameter of the grinding wheel, since as the diameter of the wheel increases the clearance available for the crowning motion at either side of the grinding zone decreases. However, since the amount of crown is measured in a few ten-thousandths of an inch, at most it will ordinarily be possible to provide the desired amount of crowning with any conventional size grinding wheel.

It is also recognized that it will be possible to crown gear teeth by a traverse and rotation of the gear, such that during the traverse, one half of one tooth surface is crowned, and during the second half of the traverse the other half of the adjacent tooth surface will be crowned. This method, however, is not as satisfactory as that disclosed herein, although it will of course be obvious that such a practice would not amount to a departure from the spirit of the present invention.

The grinding wheel may have contours formed thereon corresponding to the tooth surface at one or both edges, and may be thinned down so as to have clearance with one side of a tooth space while grinding the other side. In any case, only one side of a tooth is ground at any instant while the crowning motion is imposed.

While I have illustrated a number of specific devices for carrying out the crowning of gears on a grinding machine by superimposing a gradual motion between the gear and wheel in timed relation to its translation, it will be understood that this has been done solely to enable those skilled in the art to practice the invention, which may obviously be practiced with devices differing considerably in detail from those illustrated herein, the scope of the invention being indicated by the appended claims.

What I claim as my invention is:

1. The method of crown grinding a gear which comprises rotating a grinding wheel having a surface formed to correspond to a tooth surface of the gear, relatively moving the grinding wheel and the gear longitudinally of the latter to cause the grinding wheel to traverse a tooth space of the gear, and superimposing on this relative motion in timed relation thereto a crowning oscillation of the gear about the axis of the gear.

2. The method of crown grinding a gear which comprises translating the gear relative to a rotating grinding wheel having a surface formed to correspond to a tooth surface of the gear so as to cause the wheel to traverse a tooth space of the gear, and rotating the gear about its axis in timed relation to the translation to effect the crowning.

ROBERT S. DRUMMOND.